(12) United States Patent
Sakai

(10) Patent No.: US 11,550,890 B2
(45) Date of Patent: Jan. 10, 2023

(54) BIOMETRIC AUTHENTICATION DEVICE, METHOD AND RECORDING MEDIUM

(71) Applicant: NEC Corporation, Tokyo (JP)

(72) Inventor: Ikuko Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 16/963,671

(22) PCT Filed: Jan. 31, 2019

(86) PCT No.: PCT/JP2019/003282
§ 371 (c)(1),
(2) Date: Jul. 21, 2020

(87) PCT Pub. No.: WO2019/151368
PCT Pub. Date: Aug. 8, 2019

(65) Prior Publication Data
US 2021/0073364 A1 Mar. 11, 2021

(30) Foreign Application Priority Data
Feb. 1, 2018 (JP) .............................. JP2018-016046

(51) Int. Cl.
*G06F 21/32* (2013.01)
*G06F 3/01* (2006.01)
(Continued)

(52) U.S. Cl.
CPC .............. *G06F 21/32* (2013.01); *G06F 3/013* (2013.01); *G06F 3/0488* (2013.01);
(Continued)

(58) Field of Classification Search
CPC ........ G06F 3/013; G06F 3/0488; G06F 21/32; G06V 40/161; G06V 40/172; G06V 40/40; G06V 40/50
See application file for complete search history.

(56) References Cited

U.S. PATENT DOCUMENTS 8,856,541 B1 * 10/2014 Chaudhury ............ G06V 40/67
726/16
10,102,358 B2 * 10/2018 Wilder ..................... G06F 21/32
(Continued)

FOREIGN PATENT DOCUMENTS

EP 3208770 A1 8/2017
GB 2471045 A 12/2010
(Continued)

OTHER PUBLICATIONS

International Search Report for PCT Application No. PCT/JP2019/003282, dated Apr. 23, 2019.
(Continued)

*Primary Examiner* — Seth A Silverman

(57) ABSTRACT

The device outputs, to a display device, display information on a symbol which is to be moved and displayed; acquires a face image of a subject which has been captured by an image capturing device at a capturing timing while the display device displays the symbol; detects, from the face image, a line-of-sight position; determines that the subject of the face image is a living body when one or more prescribed conditions including a case in which the line-of-sight position matches a display position of the symbol at the image-capturing timing are all satisfied; and outputs an authentication result indicating success of the authentication when the subject is determined to be a living body and the biometric authentication is successful, and outputs an authentication result indicating failure of the authentication when the subject is determined not to be a living body or when the biometric authentication fails.

18 Claims, 9 Drawing Sheets

(51) Int. Cl.
  *G06F 3/0488* (2022.01)
  *G06V 40/40* (2022.01)
  *G06V 40/50* (2022.01)
  *G06V 40/16* (2022.01)

(52) U.S. Cl.
  CPC .......... *G06V 40/161* (2022.01); *G06V 40/172* (2022.01); *G06V 40/40* (2022.01); *G06V 40/50* (2022.01)

(56) References Cited

U.S. PATENT DOCUMENTS

| | | | |
|---|---|---|---|
| 10,360,464 B1* | 7/2019 | McKay | G06V 40/172 |
| 2014/0130148 A1 | 5/2014 | Sako et al. | |
| 2014/0310803 A1 | 10/2014 | Irie | |
| 2014/0366124 A1 | 12/2014 | Takehara et al. | |
| 2015/0310259 A1* | 10/2015 | Lau | G06V 40/176 382/118 |
| 2016/0062456 A1 | 3/2016 | Wang et al. | |
| 2017/0228586 A1* | 8/2017 | Morishita | G06V 40/161 |
| 2017/0344840 A1* | 11/2017 | Brown | G06V 40/197 |

FOREIGN PATENT DOCUMENTS

| | | |
|---|---|---|
| JP | 2006-085226 A | 3/2006 |
| JP | 2006-330936 A | 12/2006 |
| JP | 2008-305400 A | 12/2008 |
| JP | 2014-206932 A | 10/2014 |
| JP | 2015-176555 A | 10/2015 |
| WO | 2013/094065 A1 | 6/2013 |
| WO | 2016/059786 A1 | 4/2016 |

OTHER PUBLICATIONS

English translation of Written opinion for PCT Application No. PCT/JP2019/003282, dated Apr. 23, 2019.
Supplementary European Search Report for EP Application No. 19748383.7 dated Feb. 23, 2021.

* cited by examiner

BIOMETRIC AUTHENTICATION DEVICE, METHOD AND RECORDING MEDIUM

This application is a National Stage Entry of PCT/JP2019/003282 filed on Jan. 31, 2019, which claims priority from Japanese Patent Application 2018-016046 filed on Feb. 1, 2018, the contents of all of which are incorporated herein by reference, in their entirety.

TECHNICAL FIELD

The present invention relates to a biometric authentication device, a system, a method, and a recording medium that perform biometric authentication.

BACKGROUND ART

In order to prevent an unauthorized use such as spoofing when biometric authentication including face authentication is performed, a biometric authentication device needs to determine whether input information is actually biometric information.

As a biometric determination method, there are methods such as a method of blink detection, a method of tilting a face in an instructed order (PTL 1), and a method of changing an expression, for example. However, in these methods, an unauthorized use is possible by preparing a moving image of a user who is blinking, preparing a plurality of pictures of a face and an expression in a direction based on a pattern to be instructed, and the like.

Further, there is a method of preventing an unauthorized use with a picture and a moving image by detecting irregularities of a face by three dimensions (3D) scanning, but special equipment is necessary for scanning.

Further, there is a method of ensuring security by two element authentication using both an integrated circuit (IC) card and a password in addition to face authentication, but storing a password and carrying an IC card are necessary, and thus convenience of a user decreases.

In contrast, methods described in PTLs 2 and 3 detect a line of sight of a user, and perform a biometric determination. In these methods, special equipment is unnecessary for scanning. Further, since the storing and the carrying are unnecessary, convenience of a user can be improved.

For example, the method described in PTL 2 detects a line-of-sight direction of a user, and also displays, on a display unit, an image indicating a type of the line-of-sight direction. Then, whether a user is a living body is determined by whether the detected line-of-sight direction is an authentication permission line-of-sight direction.

Further, the method described in PTL 3 displays, on a presentation information display unit, presentation information to be presented to a user, and also detects information about a time change in line of sight from a face image sequence. Then, a possibility that a face represented in the face image sequence is spoofing is determined based on the information about the time change in line of sight with respect to the presentation information.

CITATION LIST

Patent Literature

[PTL 1] Japanese Unexamined Patent Application Publication No. 2008-305400
[PTL 2] Japanese Unexamined Patent Application Publication No. 2014-206932
[PTL 3] International Publication No. WO2016/059786

SUMMARY OF INVENTION

Technical Problem

However, in the method described in PTL 2, a biometric determination and face authentication are different processes. Thus, when the face authentication is performed by using a face picture after the biometric determination is cleared, an unauthorized use becomes possible.

Further, since the method described in PTL 3 continuously performs image processing in order to detect a time change in line of sight, a high load is applied to a system in order to perform image processing with high accuracy.

An object of the present invention is to provide a biometric authentication device, a system, a method, and a recording medium that are capable of improving reliability of biometric authentication by a method having a lower processing load.

Solution to Problem

In order to solve the above-described problem, a biometric authentication device according to the present invention includes: a display information output means for outputting, to a display device, display information about a symbol which is to be moved and displayed on the display device; a face image acquisition means for acquiring a face image of a subject, the face image captured by an image capturing device at an image capturing timing while the display device displays the symbol; a line-of-sight detection means for detecting, from the face image, a line-of-sight position being a position on the display device ahead of a line of sight of the subject; a biometric determination means for determining that the subject of the face image is a living body when one or more predetermined conditions including that the line-of-sight position coincides with a display position of the symbol at the image capturing timing are all satisfied; an authentication means for performing biometric authentication, based on the face image; and an authentication result output means for outputting an authentication result indicating an authentication success when the determination is made that the subject is a living body and the biometric authentication is successful, and outputting an authentication result indicating an authentication failure when the determination is made that the subject is not a living body or the biometric authentication fails.

Further, a biometric authentication method according to the present invention includes: outputting, to a display device, display information about a symbol which is to be moved and displayed on the display device; acquiring a face image of a subject, the face image captured by an image capturing device at an image capturing timing while the display device displays the symbol; detecting, from the face image, a line-of-sight position being a position on the display device ahead of a line of sight of the subject; determining that the subject of the face image is a living body when one or more predetermined conditions including that the line-of-sight position coincides with a display position of the symbol at the image capturing timing are all satisfied; performing biometric authentication, based on the face image; and outputting an authentication result indicating an authentication success when the determination is made that the subject is a living body and the biometric authentication is successful, and outputting an authentication result indicating an authentication failure when the determination is made that the subject is not a living body or the biometric authentication fails.

Further, a non-transitory computer-readable recording medium according to the present invention records a biometric authentication program causing a computer to execute: a display information output function of outputting, to a display device, display information about a symbol which is to be moved and displayed on the display device; a face image acquisition function of acquiring a face image of a subject, the face image captured by an image capturing device at an image capturing timing while the display device displays the symbol; a line-of-sight detection function of detecting, from the face image, a line-of-sight position being a position on the display device ahead of a line of sight of the subject; a biometric determination function of determining that the subject of the face image is a living body when one or more predetermined conditions including that the line-of-sight position coincides with a display position of the symbol at the image capturing timing are all satisfied; an authentication function of performing biometric authentication, based on the face image; and an authentication result output function of outputting an authentication result indicating an authentication success when the determination is made that the subject is a living body and the biometric authentication is successful, and outputting an authentication result indicating an authentication failure when the determination is made that the subject is not a living body or the biometric authentication fails.

Advantageous Effects of Invention

The biometric authentication device, the system, the method, and the recording medium according to the present invention enable improving reliability of biometric authentication by a method having a lower processing load.

EXAMPLE EMBODIMENT

First Example Embodiment

A first example embodiment of the present invention is described.

Figure 1:
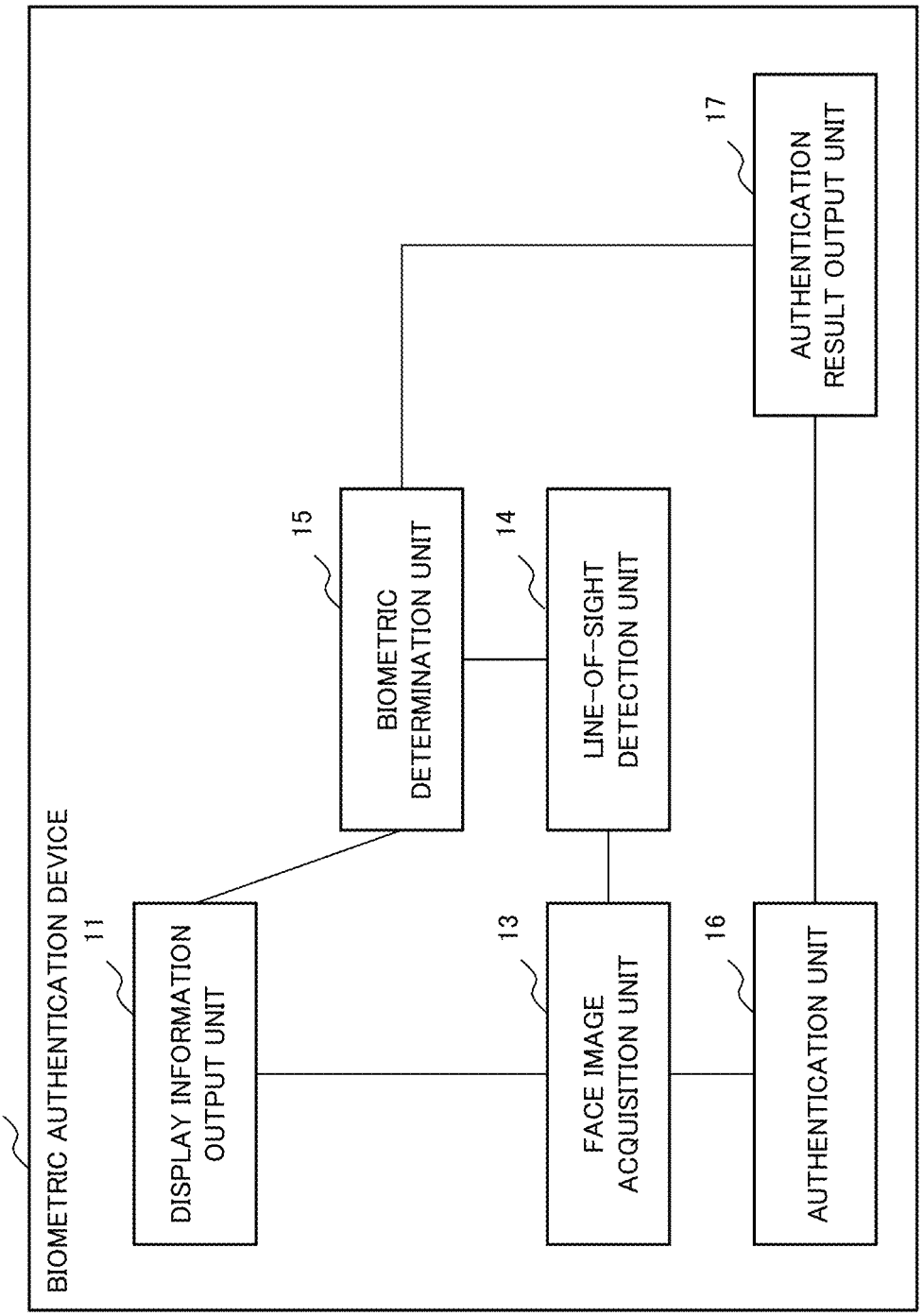
FIG. 1 shows a diagram illustrating a configuration example of a biometric authentication device according to a first example embodiment of the present invention.

FIG. 1 illustrates a configuration example of a biometric authentication device 10 according to the present example embodiment. The biometric authentication device 10 according to the present example embodiment is constituted of a display information output unit 11, a face image acquisition unit 13, a line-of-sight detection unit 14, a biometric determination unit 15, an authentication unit 16, and an authentication result output unit 17.

The display information output unit 11 is a portion that outputs, to a display device, display information about a symbol which is to be moved and displayed on the display device. The face image acquisition unit 13 is a portion that acquires a face image of a subject, the face image captured by an image capturing device at an image capturing timing while the display device displays the symbol.

The line-of-sight detection unit 14 is a portion that detects, from the face image, a line-of-sight position being a position on the display device ahead of a line of sight of the subject. The biometric determination unit 15 is a portion that determines that the subject of the face image is a living body when one or more predetermined conditions including that the line-of-sight position coincides with a display position of the symbol at the image capturing timing are all satisfied. The authentication unit 16 is a portion that performs biometric authentication, based on the face image.

The authentication result output unit 17 is a portion that outputs an authentication result indicating an authentication success when the determination is made that the subject is a living body and the biometric authentication is successful, and is a portion that outputs an authentication result indicating an authentication failure when the determination is made that the subject is not a living body or the biometric authentication fails.

The biometric authentication device 10 is configured as described above, and thus the biometric authentication device 10 causes the image capturing device to capture a face image of a subject at an image capturing timing while the display device displays a symbol that moves on the display device. Next, the biometric authentication device 10 detects a line-of-sight position of the subject from the face image, determines that the subject is a living body when the line-of-sight position coincides with a display position of the symbol at the image capturing timing, and performs biometric authentication, based on the face image. Then, the biometric authentication device 10 outputs an authentication result indicating an authentication success when the biometric authentication device 10 determines that the subject is a living body and the biometric authentication is successful, and outputs an authentication result indicating an authentication failure when the biometric authentication device 10 determines that the subject is not a living body or the biometric authentication fails.

In this way, since the biometric authentication device 10 performs a biometric determination and biometric authentication, based on the same face image, the biometric authentication device 10 is able to prevent an unauthorized use by using a face picture and the like after the biometric determination is cleared, and improve reliability of the biometric authentication. Further, since the biometric authentication device 10 checks a coincidence between a display position of a symbol at an image capturing timing and a line-of-sight position instead of detecting a time change in line of sight, the biometric authentication device 10 is able to reduce a processing load. Thus, reliability of the biometric authentication can be improved by a method having a lower processing load.

Figure 2:
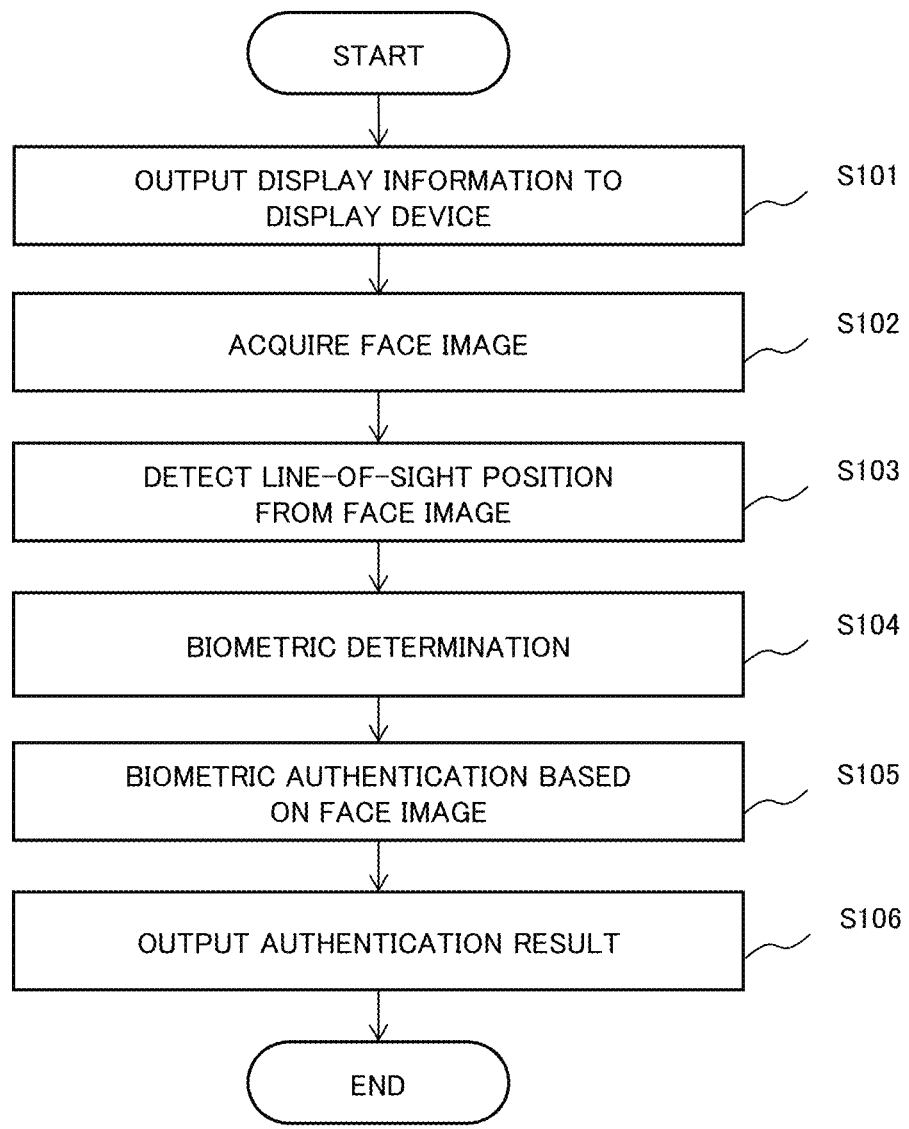
FIG. 2 shows a diagram illustrating an operation example of the biometric authentication device according to the first example embodiment of the present invention.

Next, FIG. 2 illustrates an example of an operation of the biometric authentication device 10 according to the present example embodiment.

The display information output unit 11 outputs, to the display device, display information about a symbol which is to be moved and displayed on the display device (step S101).

Next, the face image acquisition unit 13 acquires a face image of a subject, the face image captured by the image capturing device at an image capturing timing while the display device displays the symbol (step S102).

Next, the line-of-sight detection unit 14 detects, from the face image, a line-of-sight position being a position on the display device ahead of a line of sight of the subject (step S103). The biometric determination unit 15 determines that the subject of the face image is a living body when one or more predetermined conditions including that the line-of-sight position coincides with a display position of the symbol at the image capturing timing are all satisfied (step S104). Further, the authentication unit 16 performs biometric authentication, based on the face image (step S105).

Then, the authentication result output unit 17 outputs an authentication result indicating an authentication success when the determination is made that the subject is a living body and the biometric authentication is successful. Further, the authentication result output unit 17 outputs an authentication result indicating an authentication failure when the determination is made that the subject is not a living body or the biometric authentication fails (step S106).

By operating as described above, the biometric authentication device 10 causes the image capturing device to capture a face image of a subject at an image capturing timing while the display device displays a symbol that moves on the display device. Next, the biometric authentication device 10 detects a line-of-sight position of the subject from the face image, determines that the subject is a living body when the line-of-sight position coincides with a display position of the symbol at the image capturing timing, and performs biometric authentication, based on the face image. Then, the biometric authentication device 10 outputs an authentication result indicating an authentication success when the biometric authentication device 10 determines that the subject is a living body and the biometric authentication is successful, and outputs an authentication result indicating an authentication failure when the biometric authentication device 10 determines that the subject is not a living body or the biometric authentication fails. Thus, reliability of the biometric authentication can be improved by a method having a lower processing load.

As described above, according to the first example embodiment of the present invention, the biometric authentication device 10 causes the image capturing device to capture a face image of a subject at an image capturing timing while the display device displays a symbol that moves on the display device. Next, the biometric authentication device 10 detects a line-of-sight position of the subject from the face image, determines that the subject is a living body when the line-of-sight position coincides with a display position of the symbol at the image capturing timing, and performs biometric authentication, based on the face image. Then, the biometric authentication device 10 outputs an authentication result indicating an authentication success when the biometric authentication device 10 determines that the subject is a living body and the biometric authentication is successful, and outputs an authentication result indicating an authentication failure when the biometric authentication device 10 determines that the subject is not a living body or the biometric authentication fails. Thus, reliability of the biometric authentication can be improved by a method having a lower processing load.

Second Example Embodiment

Next, a second example embodiment of the present invention is described. According to the present example embodiment, a biometric authentication device 20 is more specifically described.

Figure 3:
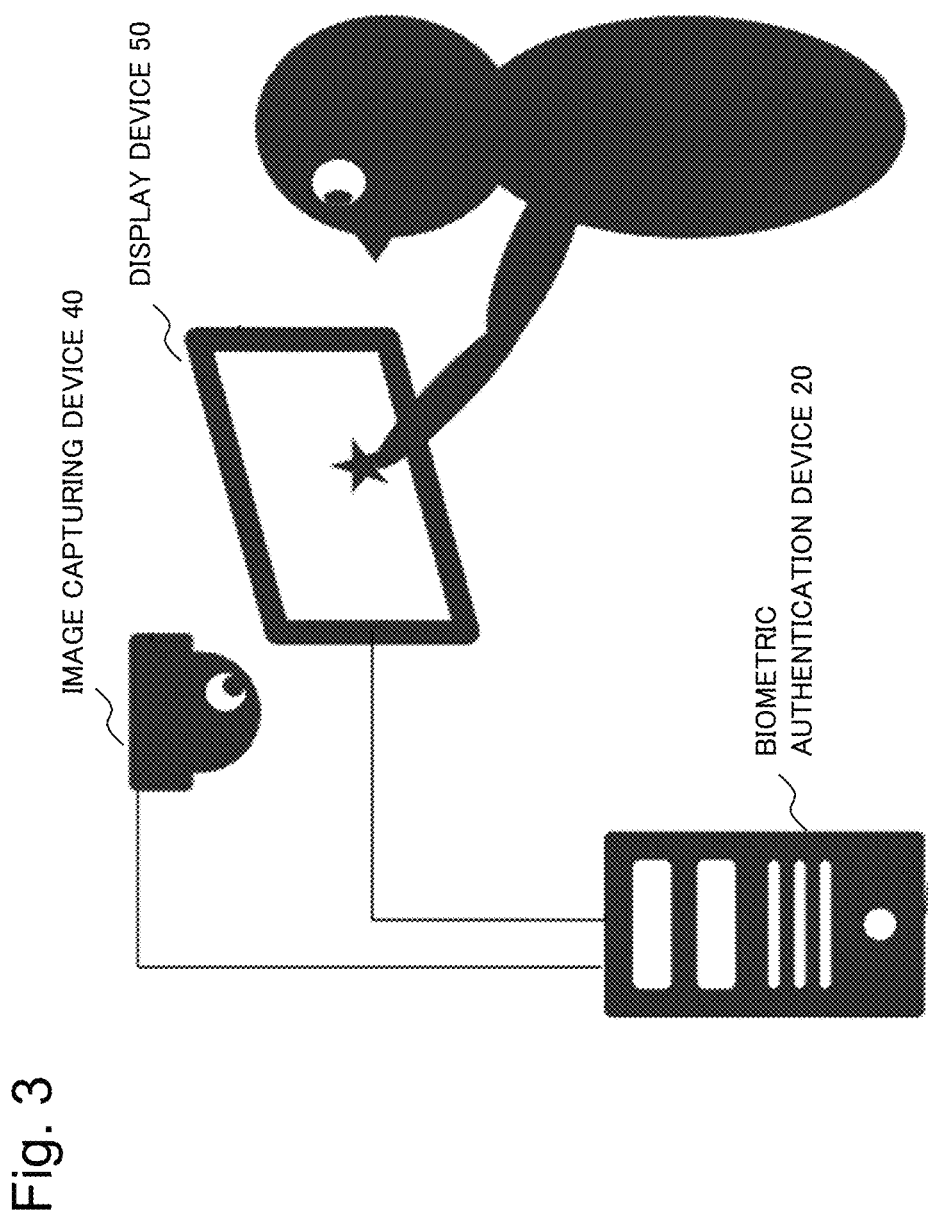
FIG. 3 shows a diagram illustrating a configuration example of a biometric authentication system according to a second example embodiment of the present invention.

First, FIG. 3 illustrates a configuration example of a biometric authentication system according to the present example embodiment. The authentication system according to the present example embodiment is constituted of the biometric authentication device 20, a display device 50, and an image capturing device 40.

The biometric authentication device 20 is a device that performs authentication of a person who views a display of the display device 50. The biometric authentication device 20 can be constituted of a personal computer and other information processing devices.

The display device 50 is a device that displays information according to display information received from the biometric authentication device 20. The biometric authentication device 20 according to the present example embodiment detects a line of sight of a user who views a display of the display device 50 from a face image captured by the image capturing device 40. Thus, it is desirable that the display device 50 has a size large enough to easily detect a line of sight of a user. When a display of the display device 50 is large, a movement distance of a line of sight of a user who views the display increases, and thus the line of sight is more easily detected.

The image capturing device 40 is a device, such as a camera, for example, that captures a user who views the display of the display device 50. The image capturing device 40 captures a face image of a user who views the display of the display device 50, and transmits the face image to the biometric authentication device 20. Note that the image capturing device 40 may be installed in the display device 50. Further, a connection between the display device 50 or the image capturing device 40 and the biometric authentication device 20 may be a wired connection or a wireless connection.

Figure 4:
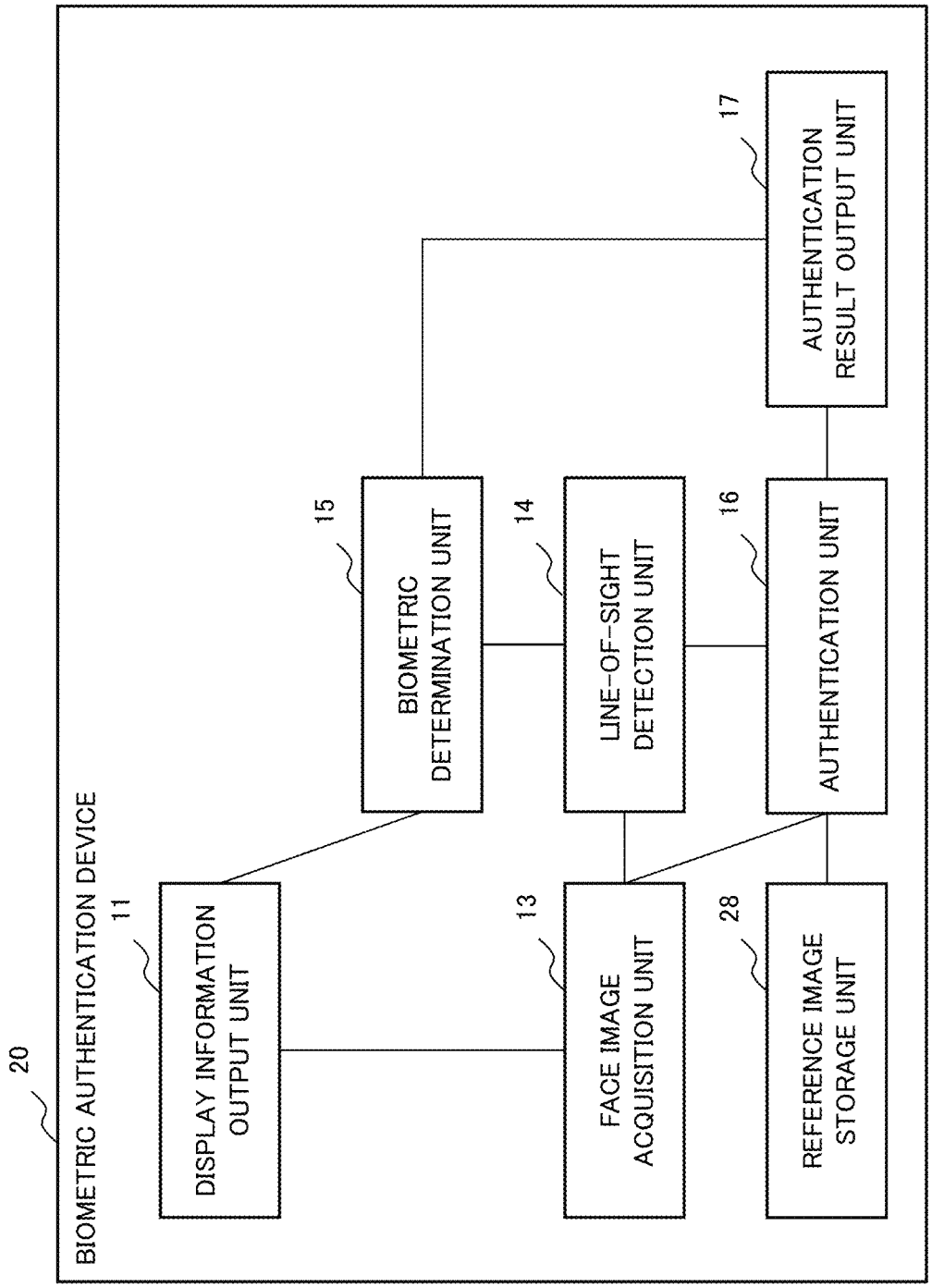
FIG. 4 shows a diagram illustrating a configuration example of a biometric authentication device according to the second example embodiment of the present invention.

Next, FIG. 4 illustrates a configuration example of the biometric authentication device 20 according to the present example embodiment. The biometric authentication device 20 has a configuration in which a reference image storage unit 28 is added to the biometric authentication device 10 (FIG. 1) according to the first example embodiment.

A display information output unit 11 is a portion that outputs, to the display device 50, display information about a symbol which is to be moved and displayed on the display device 50. The symbol is, for example, a number, a sign, a character, a picture, and the like. The display information includes, for example, information about a color and a shape of a symbol to be displayed, a display timing of the symbol, and a display position of the symbol on the display device 50. Further, the display information may be a video signal.

The display information output unit 11 generates the display information about the symbol that moves on the display device 50. Then, the display device 50 displays (animation display) the moving symbol according to the display information from the biometric authentication device 20.

Note that it is desirable that the symbol moves in a different movement pattern for each authentication. Furthermore, it is desirable that the symbol moves in a random direction. In such a manner, a degree of difficulty of an unauthorized use by a face picture and the like can be improved.

Further, it is desirable that the symbol moves continuously. A line of sight of a user is less likely to be averted from the symbol by causing eyes to follow the symbol that moves continuously. Thus, reliability of biometric authentication can be further improved.

Further, the display information may include information about a message instructing a user to follow the symbol displayed on the display device 50 with eyes. In this case, the user follows the symbol displayed on the display device 50 with eyes according to the message displayed on the display device 50. Note that the instruction to the user may use another method (such as an operation manual of a paper medium and an electronic medium) in which the user can perceive an instruction content other than a display onto the display device 50.

Figure 5:
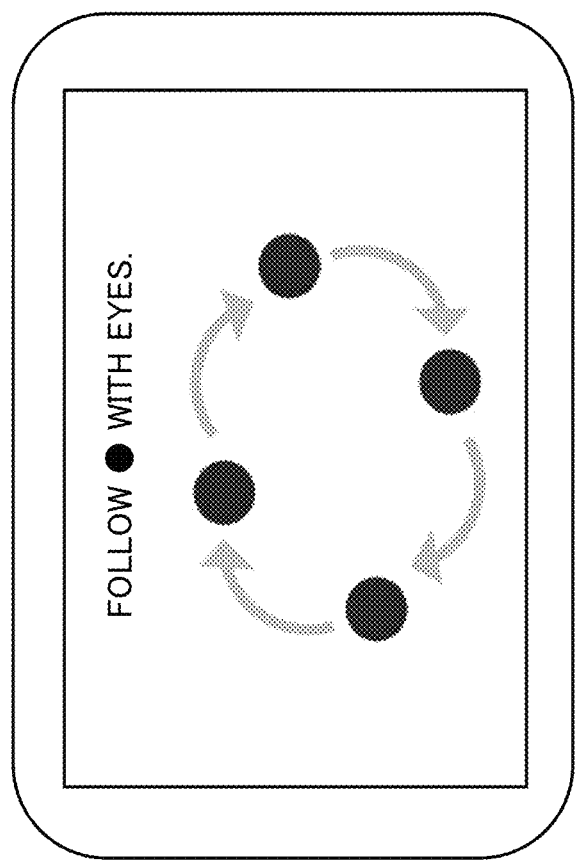
FIG. 5 shows a diagram illustrating a display example of a display device according to the second example embodiment of the present invention.

FIG. 5 illustrates an example of the display of the display device 50. In this example, the display device 50 displays a symbol that moves continuously in a random direction, and also displays a message instructing a user to follow the symbol with eyes.

A face image acquisition unit 13 is a portion that acquires a face image of a subject (user) who views the display device 50. The face image acquisition unit 13 causes the image capturing device 40 to capture a face image of a subject at an image capturing timing while the display device 50 displays a symbol. Then, the image capturing device 40 captures a face image of the subject, and the face image acquisition unit 13 acquires the face image. Note that the face image acquisition unit 13 may cause the image capturing device 40 to capture a face image at a plurality of image capturing timings, and acquire a plurality of face images.

A line-of-sight detection unit 14 is a portion that detects, from the face image acquired by the face image acquisition unit 13, a line-of-sight position being a position on the display device 50 ahead of a line of sight of the subject. For example, the line-of-sight detection unit 14 can detect an inner corner of an eye, an iris, and the like from a face image and detect a line of sight, based on a positional relationship among them, but the line-of-sight detection unit 14 can use any method of line-of-sight detection.

A biometric determination unit 15 is a portion that determines that the subject of the face image is a living body when the line-of-sight position coincides with a display position of the symbol at the image capturing timing at which the image capturing device 40 captures the face image. When the face image acquisition unit 13 acquires a plurality of face images, the biometric determination unit 15 checks a coincidence between a line-of-sight position and a display position for each of the plurality of face images, and determines that a subject is a living body when the line-of-sight position and the display position coincide with each other in all of the face images. Alternatively, the biometric determination unit 15 may check a coincidence between a line-of-sight position and a display position for each of one or more face images, and determine that a subject is a living body when the line-of-sight position and the display position coincide with each other in all of the face images having the coincidence checked.

Note that the biometric determination unit 15 can determine the display position of the symbol at the image capturing timing at which the image capturing device 40 captures the face image, based on the display information held by the display information output unit 11.

The reference image storage unit 28 is a portion that stores a reference image for face authentication. It is assumed that the reference image is previously associated with personal information that identifies an individual associated with the reference image, and is stored in the reference image storage unit 28.

An authentication unit 16 is a portion that performs biometric authentication, based on the face image acquired by the face image acquisition unit 13. For example, the authentication unit 16 checks whether a reference image of the same person as the subject of the face image acquired by the face image acquisition unit 13 is stored in the reference image storage unit 28. Then, when the reference image of the same person as the subject of the face image acquired by the face image acquisition unit 13 is stored in the reference image storage unit 28, the authentication unit 16 regards the subject of the face image as a person having personal information associated with the reference image of the same person as the subject.

Note that, when the face image acquisition unit 13 acquires a plurality of face images, biometric authentication is performed on one or more of the face images.

Further, the authentication unit 16 may perform biometric authentication simultaneously with a biometric determination in the biometric determination unit 15. Further, an authentication method is not limited to face authentication, and may be any authentication method as long as the authentication method is based on a face image. Further, for authentication, both of checking a use qualification of a person being a subject and checking a coincidence between personal information about a person to be authenticated and personal information about a subject are possible.

An authentication result output unit 17 is a portion that outputs an authentication result. The authentication result output unit 17 outputs an authentication result indicating an authentication success when the determination is made that the subject of the face image is a living body and the biometric authentication in the authentication unit 16 is successful. Further, the authentication result output unit 17 outputs an authentication result indicating an authentication failure when the determination is made that the subject of the face image is not a living body or the biometric authentication in the authentication unit 16 fails.

The biometric authentication device 20 is configured as described above, and thus the biometric authentication device 20 causes the image capturing device 40 to capture a face image of a subject at an image capturing timing while the display device 50 displays a symbol that moves on the display device 50. Next, the biometric authentication device 20 detects a line-of-sight position of the subject from the face image, determines that the subject is a living body when the line-of-sight position coincides with a display position of the symbol at the image capturing timing, and performs biometric authentication, based on the face image. Then, the biometric authentication device 20 outputs an authentication result indicating an authentication success when the biometric authentication device 20 determines that the subject is a living body and the biometric authentication is successful, and outputs an authentication result indicating an authentication failure when the biometric authentication device 20 determines that the subject is not a living body or the biometric authentication fails.

In this way, since the biometric authentication device 20 performs a biometric determination and biometric authentication, based on the same face image, the biometric authentication device 20 is able to prevent an unauthorized use by using a face picture and the like after the biometric determination is cleared, and improve reliability of the biometric authentication. Further, since the biometric authentication device 20 checks a coincidence between a display position of a symbol at an image capturing timing and a line-of-sight position instead of detecting a time change in line of sight, the biometric authentication device 20 is able to reduce a processing load. Thus, reliability of the biometric authentication can be improved by a method having a lower processing load.

Further, the authentication system according to the present example embodiment can be constituted of a general device such as a computer, a display, and a camera without a need for a special device.

Further, the biometric authentication device 20 according to the present example embodiment is able to improve reliability of the biometric authentication, and can thus reduce necessity for a password and an IC card. Accordingly, the biometric authentication device 20 is able to improve convenience of a user.

Further, the biometric authentication device 20 according to the present example embodiment can generate a large amount of transition patterns of a line of sight needed for a biometric determination by moving a symbol in a random direction. It is difficult to previously predict a display position and a transition pattern of the symbol and prepare a moving image and a picture in which a line-of-sight position is adjusted. Thus, a degree of difficulty of an unauthorized use can be improved, and reliability of the biometric authentication can be further improved.

Further, the biometric authentication device 20 according to the present example embodiment displays a symbol that moves on the display device 50, and thus a line of sight of a user is less likely to be averted from the symbol. Thus, reliability of the biometric authentication can be further improved.

Next, an operation example of the biometric authentication device 20 according to the present example embodiment is described by using FIG. 2.

The display information output unit 11 outputs, to the display device 50, display information about a symbol which is to be moved and displayed on the display device 50 (step S101). In this way, the display device 50 displays the moving symbol according to the display information. Then, a user who views the display device 50 follows the moving symbol displayed on the display device 50 with eyes according to a message displayed on the display device 50, an operation manual of the biometric authentication device 20, or the like.

Next, the face image acquisition unit 13 causes the image capturing device 40 to capture a face image of a subject (user) who views the display device 50 at an image capturing timing while the display device 50 displays the symbol. Then, the image capturing device 40 captures a face image of the subject, and the face image acquisition unit 13 acquires the face image (step S102).

Next, the line-of-sight detection unit 14 detects, from the face image acquired by the face image acquisition unit 13, a line-of-sight position being a position on the display device 50 ahead of a line of sight of the subject (step S103).

Then, the biometric determination unit 15 determines that the subject of the face image is a living body when the line-of-sight position coincides with a display position of the symbol at the image capturing timing at which the image capturing device 40 captures the face image (step S104).

Further, the authentication unit 16 performs biometric authentication, based on the face image acquired by the face image acquisition unit 13 (step S105). Then, the authentication result output unit 17 outputs an authentication result indicating an authentication success when the determination is made that the subject of the face image is a living body and the biometric authentication in the authentication unit 16 is successful. Further, the authentication result output unit 17 outputs an authentication result indicating an authentication failure when the determination is made that the subject of the face image is not a living body or the biometric authentication in the authentication unit 16 fails (step S106).

By operating as described above, the biometric authentication device 20 causes the image capturing device 40 to capture a face image of a subject at an image capturing timing while the display device 50 displays a symbol that moves on the display device 50. Next, the biometric authentication device 20 detects a line-of-sight position of the subject from the face image, determines that the subject is a living body when the line-of-sight position coincides with a display position of the symbol at the image capturing timing, and performs biometric authentication, based on the face image. Then, the biometric authentication device 20 outputs an authentication result indicating an authentication success when the biometric authentication device 20 determines that the subject is a living body and the biometric authentication is successful, and outputs an authentication result indicating an authentication failure when the biometric authentication device 20 determines that the subject is not a living body or the biometric authentication fails. Thus, reliability of the biometric authentication can be improved by a method having a lower processing load.

As described above, according to the second example embodiment of the present invention, the biometric authentication device 20 causes the image capturing device 40 to capture a face image of a subject at an image capturing timing while the display device 50 displays a symbol that moves on the display device 50. Next, the biometric authentication device 20 detects a line-of-sight position of the subject from the face image, determines that the subject is a living body when the line-of-sight position coincides with a display position of the symbol at the image capturing timing, and performs biometric authentication, based on the face image. Then, the biometric authentication device 20 outputs an authentication result indicating an authentication success when the biometric authentication device 20 determines that the subject is a living body and the biometric authentication is successful, and outputs an authentication result indicating an authentication failure when the biometric authentication device 20 determines that the subject is not a living body or the biometric authentication fails. Thus, reliability of the biometric authentication can be improved by a method having a lower processing load.

Third Example Embodiment

Next, a third example embodiment of the present invention is described. According to the present example embodiment, a biometric authentication device 30 that further improves reliability of biometric authentication by further causing a user to perform a touch input on a display device 50 is described.

First, a configuration example of an authentication system according to the present example embodiment is described by using FIG. 3. A difference between the authentication system according to the present example embodiment and the authentication system according to the second example embodiment is a point in that the display device 50 according to the present example embodiment includes a function of detecting a touch input of a user on the display device 50 in addition to a display function. In other words, the display device 50 according to the present example embodiment is a touch panel display and the like. The display device 50 according to the present example embodiment detects a position of a touch input on the display device 50 when the touch input is performed on the display device 50, and outputs information (touch position information) about the position (touch position) to the display device 50.

Note that a method of detecting a touch input and a touch position is not limited to an electrical capacitance method, and any method can be used. For example, the display device 50 is not limited to a touch panel display, and may be a panel in which a plurality of physical buttons are arranged.

Figure 6:
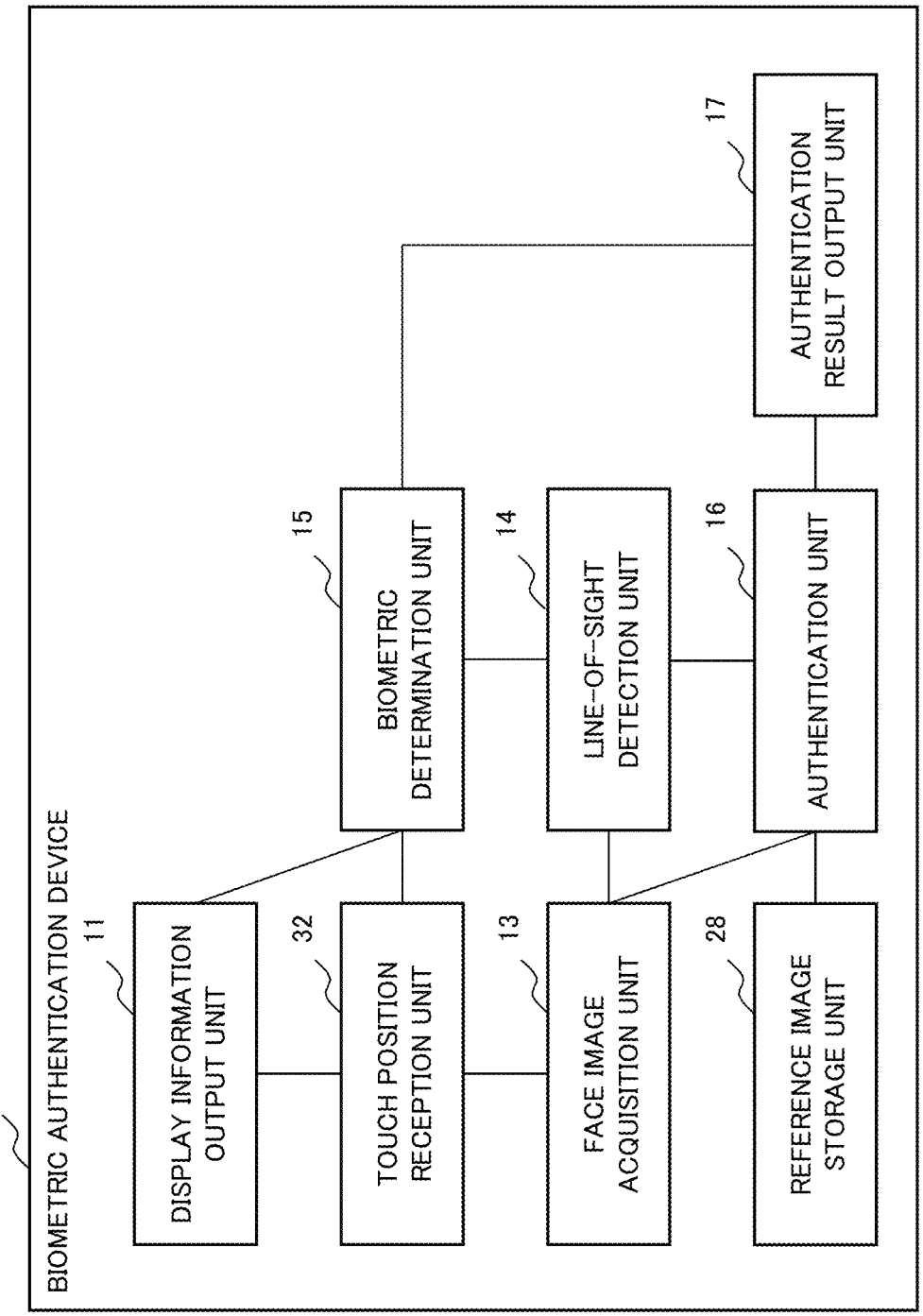
FIG. 6 shows a diagram illustrating a configuration example of a biometric authentication device according to a third example embodiment of the present invention.

Next, FIG. 6 illustrates a configuration example of the biometric authentication device 30 according to the present example embodiment. The biometric authentication device 30 has a configuration in which a touch position reception unit 32 is added to the biometric authentication device 20 (FIG. 4) according to the second example embodiment.

A display information output unit 11 is a portion that outputs, to the display device 50, display information about a symbol which is to be moved and displayed on the display device 50. The display information and the symbol are similar to those in the second example embodiment.

Further, the display information according to the present example embodiment may include information about a message instructing a user to touch a symbol displayed on the display device 50. In this case, the user touches the symbol displayed on the display device 50 according to the message displayed on the display device 50. Note that the instruction to the user may use another method (such as an operation manual of a paper medium and an electronic medium) in which the user can perceive an instruction content other than a display on the display device 50.

Figure 7:
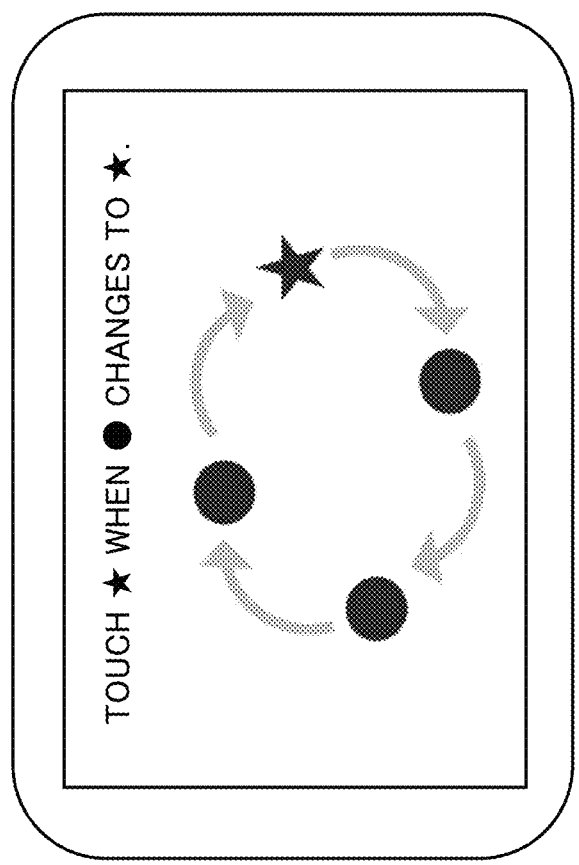
FIG. 7 shows a diagram illustrating a display example of a display device according to the third example embodiment of the present invention.

FIG. 7 illustrates an example of a display of the display device 50. In this example, the display device 50 displays a symbol that moves continuously in a random direction, and also displays a message instructing a user to touch the symbol. As in this example, the message may include a timing (such as a time at which a color or a shape of a symbol changes) of a touch.

The touch position reception unit 32 is a portion that receives, from the display device 50, touch position information indicating a touch position being a position of a touch input on the display device 50 when the touch input is performed on the display device 50. When a user touches the display device 50, the display device 50 detects a touch position on the display device 50 on which a touch input is performed, and outputs touch position information to the touch position reception unit 32. Then, the touch position reception unit 32 receives the touch position information from the display device 50.

A face image acquisition unit 13 is a portion that acquires a face image of a subject (user) who views the display device 50. According to the present example embodiment, the face image acquisition unit 13 acquires a face image when the face image acquisition unit 13 receives the touch position information from the display device 50.

For example, the face image acquisition unit 13 causes an image capturing device 40 to capture a face image of a subject when the face image acquisition unit 13 receives the touch position information from the display device 50. Then, the face image acquisition unit 13 acquires the face image captured by the image capturing device 40. Note that, in this case, when image capturing of a face image is instantaneously performed by the image capturing device 40 from a touch input by a user, it means that the image capturing device 40 captures the face image of the user at a moment at which the user is performing the touch input.

The image capturing device 40 may capture a user before a touch input is performed in such a way that the face image acquisition unit 13 can acquire a face image at a time as close to a time of the touch input as possible even when there is a delay in processing and transmission/reception of information. In this case, the image capturing device 40 or the face image acquisition unit 13 may temporarily store a captured image (still image or moving image) captured by the image capturing device 40, and the face image acquisition unit 13 may acquire, as a face image, an image at a time at which the face image acquisition unit 13 receives touch position information from stored captured images. Alternatively, the face image acquisition unit 13 may receive touch time information indicating a time at which a touch input is performed from the display device 50, and acquire, as a face image, a captured image at the touch time indicated by the touch time information, from captured images. Alternatively, when a time of processing and transmission/reception of information is fixed, the fixed time may be considered, and a captured image before a predetermined time from a time at which touch position information is received may be acquired as a face image.

A line-of-sight detection unit 14 is a portion that detects a line-of-sight position from the face image acquired by the face image acquisition unit 13.

A biometric determination unit 15 is a portion that determines that the subject of the face image is a living body when one or more predetermined conditions including that the line-of-sight position coincides with a display position of the symbol at the image capturing timing at which the image capturing device 40 captures the face image are all satisfied. According to the present example embodiment, the conditions further include that a touch position indicated by the touch position information coincides with the display position. When a timing (such as a time at which a color or a shape changes) of a touch input is instructed to a user, the conditions further include that a timing of the touch input coincides with the instructed timing.

In a case where the user is caused to perform a touch input for a plurality of times and the face image acquisition unit 13 acquires a plurality of face images, the biometric determination unit 15 determines that the subject is a living body when a line-of-sight position, a touch position, and a display position coincide with one another for each touch input. Alternatively, the biometric determination unit 15 may check a coincidence among a line-of-sight position, a touch position, and a display position for one or more touch inputs, and check a coincidence between a touch position and a display position without including a line-of-sight position for another touch input.

Note that the biometric determination unit 15 can determine the display position of the symbol at the image capturing timing at which the image capturing device 40 captures the face image, based on the display information held by the display information output unit 11.

An authentication unit 16 is a portion that performs biometric authentication, based on the face image acquired by the face image acquisition unit 13. Authentication is similar to that according to the second example embodiment, and thus description thereof is omitted.

An authentication result output unit 17 is a portion that outputs an authentication result. The authentication result output unit 17 outputs an authentication result indicating an authentication success when the determination is made that the subject of the face image is a living body and the biometric authentication in the authentication unit 16 is successful. Further, the authentication result output unit 17 outputs an authentication result indicating an authentication failure when the determination is made that the subject of the face image is not a living body or the biometric authentication in the authentication unit 16 fails.

The biometric authentication device 30 is configured as described above, and thus the biometric authentication device 30 causes the image capturing device 40 to capture a face image of a subject at an image capturing timing while the display device 50 displays a symbol that moves on the display device 50. Next, the biometric authentication device 30 detects a line-of-sight position of the subject from the face image, determines that the subject is a living body when the line-of-sight position coincides with a display position of the symbol at the image capturing timing, and performs biometric authentication, based on the face image. Then, the biometric authentication device 30 outputs an authentication result indicating an authentication success when the biometric authentication device 30 determines that the subject is a living body and the biometric authentication is successful, and outputs an authentication result indicating an authentication failure when the biometric authentication device 30 determines that the subject is not a living body or the biometric authentication fails.

In this way, since the biometric authentication device 30 performs a biometric determination and biometric authentication, based on the same face image, the biometric authentication device 30 is able to prevent an unauthorized use by using a face picture and the like after the biometric determination is cleared, and improve reliability of the biometric authentication. Further, since the biometric authentication device 30 checks a coincidence between a display position of a symbol at an image capturing timing and a line-of-sight position instead of detecting a time change in line of sight, the biometric authentication device 30 is able to reduce a processing load. Thus, reliability of the biometric authentication can be improved by a method having a lower processing load.

Further, the biometric authentication device 30 according to the present example embodiment performs acquisition of a face image when the biometric authentication device 30 receives touch position information from the display device 50, and the biometric authentication device 30 determines that a subject of the face image is a living body when a touch position and a display position coincide with each other. In this way, since the biometric authentication device 30 detects a line-of-sight position from the face image at a moment of or immediately after a touch, a determination is not affected by a user averting a line of sight from a symbol at another timing. Thus, a burden on the user can be reduced.

Further, it can be expected that a line of sight is turned onto a position of a symbol at a moment when the user touches the symbol. Thus, by causing the user to touch the symbol, a line-of-sight position is more likely to be closer to a display position, and reliability of biometric authentication can be further improved. Further, since a touch input requires an operation by human, a degree of difficulty of an unauthorized use can be improved by requiring a touch input. Further, a degree of difficulty of an unauthorized use can be further improved by increasing the number of times of a touch onto a symbol.

Further, since the authentication system according to the present example embodiment requires a touch input onto the display device 50, the user is guided to a range of the front of the display device 50 in which an arm reaches the display device 50. In this way, a positional relationship between the image capturing device 40 and a face of a subject is more likely to fall within a certain determined range, and thus a possibility of false recognition can be reduced. Thus, accuracy of face authentication and line-of-sight detection can be further improved.

Further, the authentication system according to the present example embodiment can be constituted of a general device such as a computer, a touch panel display, and a camera without a need for a special device.

Figure 8:
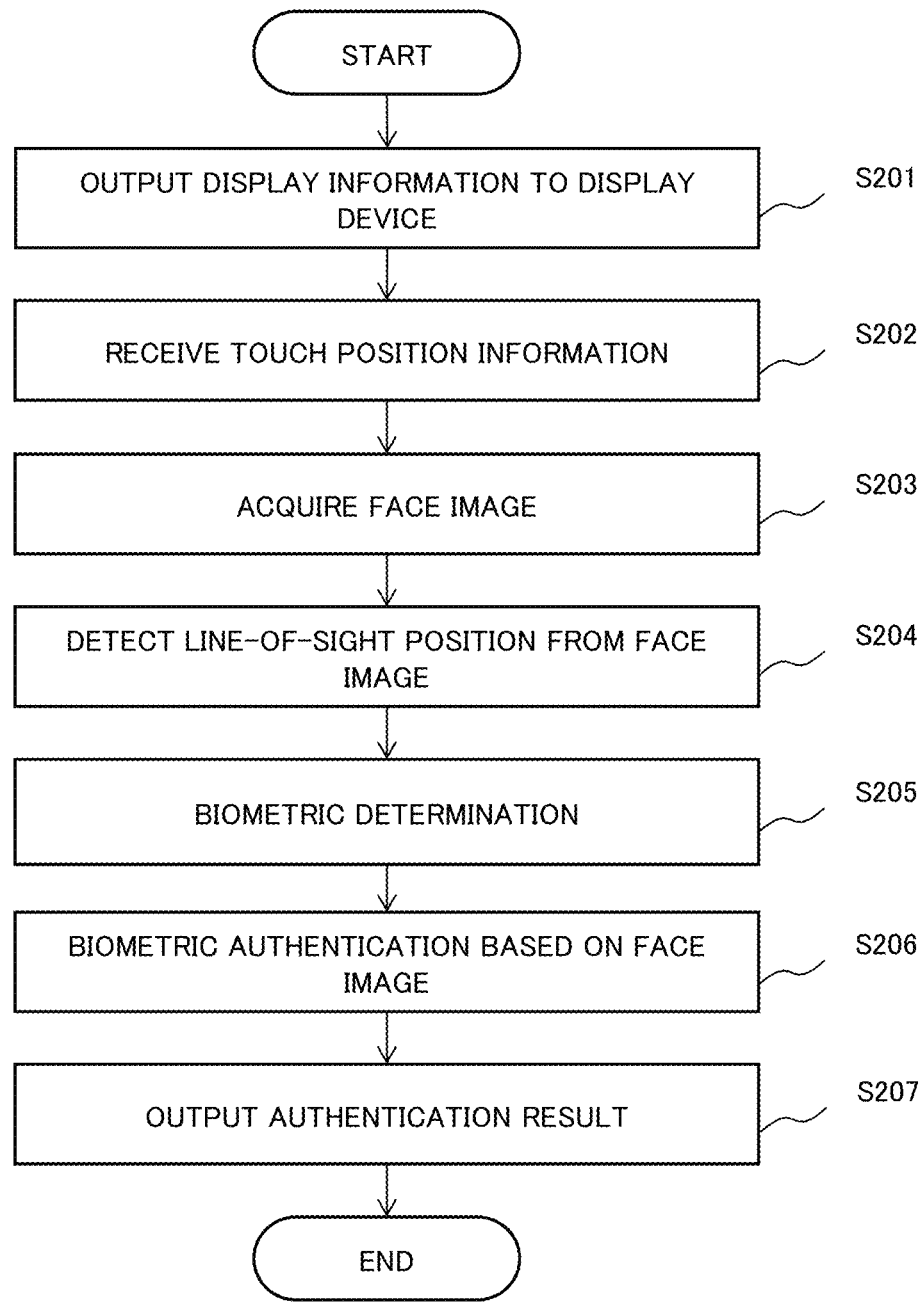
FIG. 8 shows a diagram illustrating an operation example of the biometric authentication device according to the third example embodiment of the present invention.

Next, FIG. 8 illustrates an operation example of the biometric authentication device 30 according to the present example embodiment.

The display information output unit 11 outputs, to the display device 50, display information about a symbol which is to be moved and displayed on the display device 50 (step S201). In this way, the display device 50 displays the moving symbol according to the display information. Then, a user who views the display device 50 touches the moving symbol displayed on the display device 50 according to a message displayed on the display device 50, an operation manual of the biometric authentication device 30, and the like.

When the user touches the display device 50, the display device 50 detects a touch position on the display device 50 on which a touch input is performed, and outputs touch position information to the touch position reception unit 32. Then, the touch position reception unit 32 receives the touch position information from the display device 50 (step S202).

The face image acquisition unit 13 acquires a face image when the face image acquisition unit 13 receives the touch position information from the display device 50 (step S203). For example, the face image acquisition unit 13 receives time information about the touch input from the display device 50, and acquires a face image associated with the time information about the touch input from face images captured by the image capturing device 40 and temporarily stored.

Next, the line-of-sight detection unit 14 detects, from the face image acquired by the face image acquisition unit 13, a line-of-sight position being a position on the display device 50 ahead of a line of sight of the subject (step S204).

Then, the biometric determination unit 15 determines that the subject of the face image is a living body when the line-of-sight position, a display position of the symbol at an image capturing timing at which the image capturing device 40 captures the face image, and the touch position indicated by the touch position information coincide with one another (step S205).

Further, the authentication unit 16 performs biometric authentication, based on the face image acquired by the face image acquisition unit 13 (step S206). Then, the authentication result output unit 17 outputs an authentication result indicating an authentication success when the determination is made that the subject of the face image is a living body and the biometric authentication in the authentication unit 16 is successful. Further, the authentication result output unit 17 outputs an authentication result indicating an authentication failure when the determination is made that the subject of the face image is not a living body or the biometric authentication in the authentication unit 16 fails (step S207).

By operating as described above, the biometric authentication device 30 causes the image capturing device 40 to capture a face image of a subject at an image capturing timing while the display device 50 displays a symbol that moves on the display device 50. Next, the biometric authentication device 30 detects a line-of-sight position of the subject from the face image, determines that the subject is a living body when the line-of-sight position coincides with a display position of the symbol at the image capturing timing, and performs biometric authentication, based on the face image. Then, the biometric authentication device 30 outputs an authentication result indicating an authentication success when the biometric authentication device 30 determines that the subject is a living body and the biometric authentication is successful, and outputs an authentication result indicating an authentication failure when the biometric authentication device 30 determines that the subject is not a living body or the biometric authentication fails. Thus, reliability of the biometric authentication can be improved by a method having a lower processing load.

As described above, according to the third example embodiment of the present invention, the biometric authentication device 30 causes the image capturing device 40 to capture a face image of a subject at an image capturing timing while the display device 50 displays a symbol that moves on the display device 50. Next, the biometric authentication device 30 detects a line-of-sight position of the subject from the face image, determines that the subject is a living body when the line-of-sight position coincides with a display position of the symbol at the image capturing timing, and performs biometric authentication, based on the face image. Then, the biometric authentication device 30 outputs an authentication result indicating an authentication success when the biometric authentication device 30 determines that the subject is a living body and the biometric authentication is successful, and outputs an authentication result indicating an authentication failure when the biometric authentication device 30 determines that the subject is not a living body or the biometric authentication fails. Thus, reliability of the biometric authentication can be improved by a method having a lower processing load.

<Hardware Configuration Example>

A configuration example of a hardware source that achieves the biometric authentication device (10, 20, 30) according to each of the example embodiments of the present invention described above by using one information processing device (computer) is described. Note that the biometric authentication device may be achieved by physically or functionally using at least two information processing devices. Further, the biometric authentication device may be achieved as a dedicated device. Further, only a part of a function of the biometric authentication device may be achieved by using the information processing device.

Figure 9:
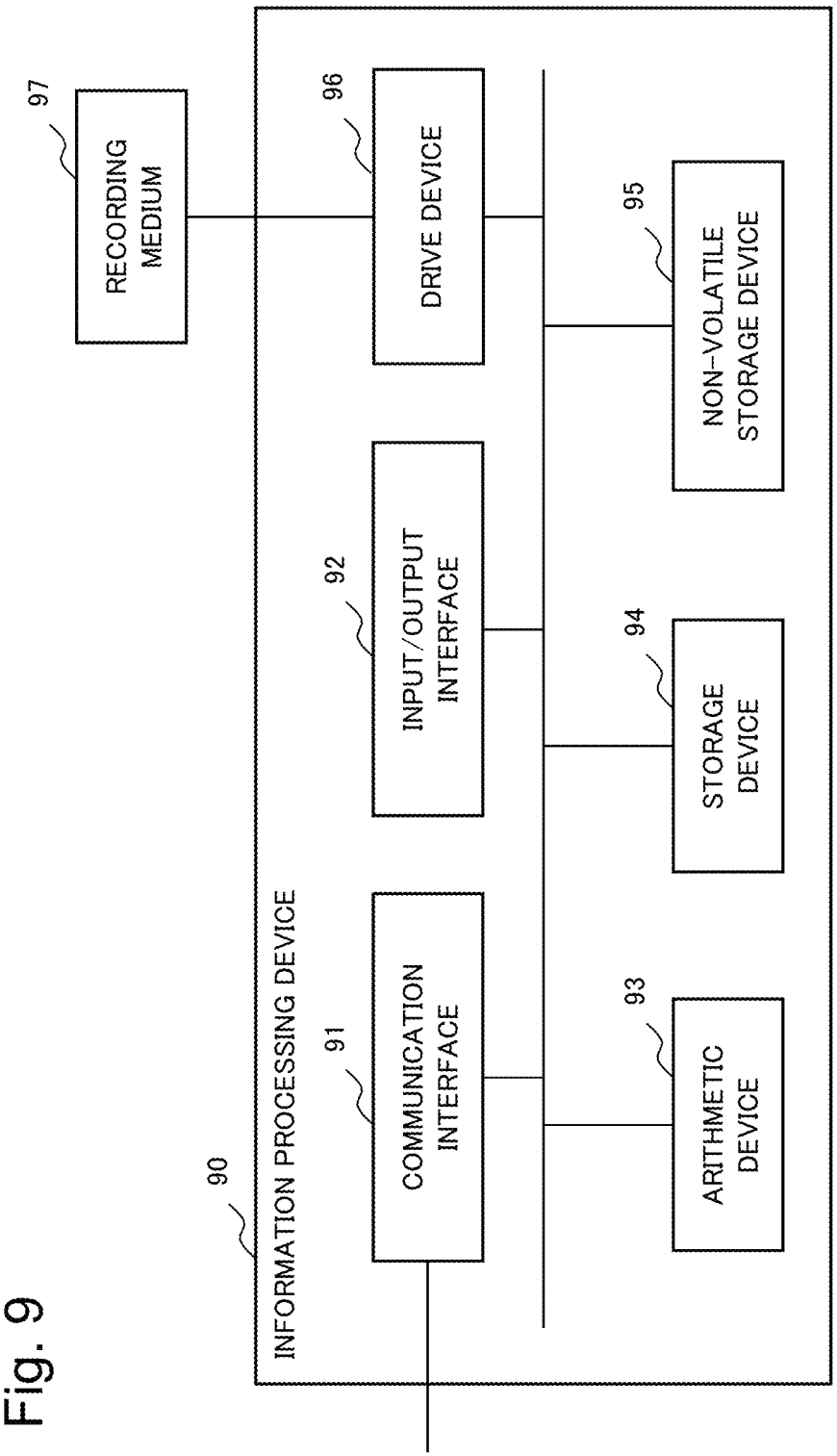
FIG. 9 shows a diagram illustrating a hardware configuration example according to each of the example embodiments of the present invention.

FIG. 9 is a diagram schematically illustrating a hardware configuration example of an information processing device that can achieve the biometric authentication device according to each of the example embodiments of the present invention. An information processing device 90 includes a communication interface 91, an input/output interface 92, an arithmetic device 93, a storage device 94, a non-volatile storage device 95, and a drive device 96.

The communication interface 91 is a communication means for allowing the biometric authentication device according to each of the example embodiments to communicate with an external device in a wired and/or wireless manner. Note that, when the biometric authentication device is achieved by using at least two information processing devices, the biometric authentication device may be connected in such a way as to perform communication between the information processing devices with each other via the communication interface 91.

The input/output interface 92 is a man-machine interface, such as a keyboard being one example of an input device and a display as an output device.

The arithmetic device 93 is an arithmetic processing device, such as a general-purpose central processing unit (CPU) and a microprocessor. For example, the arithmetic device 93 can read, in the storage device 94, various types of programs stored in the non-volatile storage device 95, and execute processing according to the read program.

The storage device 94 is a memory device, such as a random access memory (RAM), that can be referred from the arithmetic device 93, and stores a program, various types of data, and the like. The storage device 94 may be a volatile memory device.

The non-volatile storage device 95 is a non-volatile storage device such as a read only memory (ROM) and a flash memory, for example, and can store various types of programs, data, and the like.

For example, the drive device 96 is a device that processes reading and writing of data from and to the recording medium 97 described later.

The recording medium 97 is any recording medium that can record data, such as an optical disk, a magneto-optical disk, and a semiconductor flash memory, for example.

For example, according to each of the example embodiments of the present invention, the biometric authentication device may be constituted of the information processing device 90 illustrated in FIG. 9, and each of the example embodiments may be achieved by supplying, to the biometric authentication device, a program that can execute a function described in each of the above-described example embodiments.

In this case, the example embodiment can be achieved by the arithmetic device 93 executing the program supplied to the biometric authentication device. Further, a part of a function instead of the entire biometric authentication device can also be constituted of the information processing device 90.

Furthermore, it may be configured in such a way that the above-described program is recorded in the recording medium 97, and the above-described program is appropriately stored in the non-volatile storage device 95 at a shipment stage, an operation stage, or the like of the biometric authentication device. Note that, in this case, as a method of supplying the above-described program, a method of installing the above-described program inside the biometric authentication device by using an appropriate jig at a manufacturing stage before shipment, an operation stage, or the like may be adopted. Further, as the method of supplying the above-described program, a general procedure such as a method of downloading from the outside via a communication line such as the Internet may be adopted.

The whole or part of the example embodiments disclosed above can be described as, but not limited to, the following supplementary notes (Supplementary Note 1)

A biometric authentication device comprising:

a display information output means for outputting, to a display device, display information about a symbol which is to be moved and displayed on a display device;

a face image acquisition means for acquiring a face image of a subject, the face image captured by an image capturing device at an image capturing timing while the display device displays the symbol;

a line-of-sight detection means for detecting, from the face image, a line-of-sight position being a position on the display device ahead of a line of sight of the subject;

a biometric determination means for determining that the subject of the face image is a living body when one or more predetermined conditions including that the line-of-sight position coincides with a display position of the symbol at the image capturing timing are all satisfied;

an authentication means for performing biometric authentication, based on the face image; and an authentication result output means for outputting an authentication result indicating an authentication success when the determination is made that the subject is a living body and the biometric authentication is successful, and outputting an authentication result indicating an authentication failure when the determination is made that the subject is not a living body or the biometric authentication fails.

(Supplementary Note 2)

The biometric authentication device according to supplementary note 1, wherein the symbol moves on the display device in a random direction.

(Supplementary Note 3)

The biometric authentication device according to supplementary note 1 or 2, wherein the symbol moves continuously on the display device.

(Supplementary Note 4)

The biometric authentication device according to any one of supplementary notes 1 to 3, further comprising:

a touch position reception means for receiving, from the display device, touch position information indicating a touch position being a position of a touch input on the display device when the touch input is performed on the display device, wherein the face image acquisition means performs the acquisition of the face image when the touch position information is received, and the conditions further include that the touch position indicated by the touch position information coincides with the display position.

(Supplementary Note 5)

The biometric authentication device according to supplementary note 4, wherein the face image acquisition means causes the image capturing device to capture the face image when the touch position information is received.

(Supplementary Note 6)

The biometric authentication device according to supplementary note 4, wherein the face image acquisition means causes the image capturing device to capture a captured image of the subject before the touch input is performed, and performs the acquisition of, as the face image, the captured image before a predetermined time from a time at which the touch position information is received, from the captured images.

(Supplementary Note 7)

The biometric authentication device according to supplementary note 4, wherein the touch position reception means further receives touch time information indicating a time at which the touch input is performed, and the face image acquisition means causes the image capturing device to capture a captured image of the subject before the touch input is performed, and performs the acquisition of, as the face image, the captured image at a touch time indicated by the touch time information, from the captured images.

(Supplementary Note 8)

The biometric authentication device according to any one of supplementary notes 1 to 7, wherein the authentication means regards, when a reference image of a same person as the subject of the face image is stored in a reference image storage means for storing personal information specifying an individual and the reference image in association with each other, the subject of the face image as a person having the personal information associated with the reference image of the same person as the subject.

(Supplementary Note 9)

The biometric authentication device according to supplementary note 8, wherein the biometric authentication is any of checking a use qualification of a person having the personal information and checking a coincidence between the personal information about a person to be authenticated and the personal information about the subject.

(Supplementary Note 10)

An authentication system, comprising:

the biometric authentication device according to any one of supplementary notes 1 to 9;

the display device; and the image capturing device.

(Supplementary Note 11)

A biometric authentication method, comprising:

outputting, to a display device, display information about a symbol which is to be moved and displayed on the display device;

acquiring a face image of a subject, the face image captured by an image capturing device at an image capturing timing while the display device displays the symbol;

detecting, from the face image, a line-of-sight position being a position on the display device ahead of a line of sight of the subject;

determining that the subject of the face image is a living body when one or more predetermined conditions including that the line-of-sight position coincides with a display position of the symbol at the image capturing timing are all satisfied;

performing biometric authentication, based on the face image; and outputting an authentication result indicating an authentication success when the determination is made that the subject is a living body and the biometric authentication is successful, and outputting an authentication result indicating an authentication failure when the determination is made that the subject is not a living body or the biometric authentication fails.

(Supplementary Note 12)

The biometric authentication method according to supplementary note 11, wherein the symbol moves on the display device in a random direction.

(Supplementary Note 13)

The biometric authentication method according to supplementary note 11 or 12, wherein the symbol moves continuously on the display device.

(Supplementary Note 14)

The biometric authentication method according to any one of supplementary notes 11 to 13, further comprising:

receiving, from the display device, touch position information indicating a touch position being a position of a touch input on the display device when the touch input is performed on the display device; and performing the acquisition of the face image when receiving the touch position information, wherein the conditions further include that the touch position indicated by the touch position information coincides with the display position.

(Supplementary Note 15)

The biometric authentication method according to supplementary note 14, further comprising:

causing the image capturing device to capture the face image when receiving the touch position information.

(Supplementary Note 16)

The biometric authentication method according to supplementary note 14, further comprising:

causing the image capturing device to capture a captured image of the subject before the touch input is performed, and performing the acquisition of, as the face image, the captured image before a predetermined time from a time at which the touch position information is received, from the captured images.

(Supplementary Note 17)

The biometric authentication method according to supplementary note 14, further comprising:

receiving touch time information indicating a time at which the touch input is performed; and causing the image capturing device to capture a captured image of the subject before the touch input is performed, and performing the acquisition of, as the face image, the captured image at a touch time indicated by the touch time information, from the captured images.

(Supplementary Note 18)

The biometric authentication method according to any one of supplementary notes 11 to 17, further comprising:

regarding, when a reference image of a same person as the subject of the face image is stored in a reference image storage unit that stores personal information specifying an individual and the reference image in association with each other, the subject of the face image as a person having the personal information associated with the reference image of the same person as the subject.

(Supplementary Note 19)

The biometric authentication method according to supplementary note 18, wherein the biometric authentication is any of checking a use qualification of a person having the personal information and checking a coincidence between the personal information about a person to be authenticated and the personal information about the subject.

(Supplementary Note 20)

A computer-readable recording medium that records a biometric authentication program causing a computer to execute:

a display information output function of outputting, to a display device, display information about a symbol which is to be moved and displayed on the display device;

a face image acquisition function of acquiring a face image of a subject, the face image captured by an image capturing device at an image capturing timing while the display device displays the symbol;

a line-of-sight detection function of detecting, from the face image, a line-of-sight position being a position on the display device ahead of a line of sight of the subject;

a biometric determination function of determining that the subject of the face image is a living body when one or more predetermined conditions including that the line-of-sight position coincides with a display position of the symbol at the image capturing timing are all satisfied;

an authentication function of performing biometric authentication, based on the face image; and an authentication result output function of outputting an authentication result indicating an authentication success when the determination is made that the subject is a living body and the biometric authentication is successful, and outputting an authentication result indicating an authentication failure when the determination is made that the subject is not a living body or the biometric authentication fails.

(Supplementary Note 21)

The computer-readable recording medium that records the biometric authentication program according to supplementary note 20, wherein the symbol moves on the display device in a random direction.

(Supplementary Note 22)

The computer-readable recording medium that records the biometric authentication program according to supplementary note 20 or 21, wherein the symbol moves continuously on the display device.

(Supplementary Note 23)

The computer-readable recording medium that records the biometric authentication program according to any one of supplementary notes 20 to 22, further causing a computer to execute:

a touch position reception function of receiving, from the display device, touch position information indicating a touch position being a position of a touch input on the display device when the touch input is performed on the display device, wherein the face image acquisition function performs the acquisition of the face image when the touch position information is received, and the conditions further include that the touch position indicated by the touch position information coincides with the display position.

(Supplementary Note 24)

The computer-readable recording medium that records the biometric authentication program according to supplementary note 23, wherein the face image acquisition function causes the image capturing device to capture the face image when the touch position information is received.

(Supplementary Note 25)

The computer-readable recording medium that records the biometric authentication program according to supplementary note 23, wherein the face image acquisition function causes the image capturing device to capture a captured image of the subject before the touch input is performed, and performs the acquisition of, as the face image, the captured image before a predetermined time from a time at which the touch position information is received, from the captured images.

(Supplementary Note 26)

The computer-readable recording medium that records the biometric authentication program according to supplementary note 23, wherein the touch position reception function further receives touch time information indicating a time at which the touch input is performed, and the face image acquisition function causes the image capturing device to capture a captured image of the subject before the touch input is performed, and performs the acquisition of, as the face image, the captured image at a touch time indicated by the touch time information, from the captured images.

(Supplementary Note 27)

The computer-readable recording medium that records the biometric authentication program according to any one of supplementary notes 20 to 26, wherein the authentication function regards, when a reference image of a same person as the subject of the face image is stored in a reference image storage unit that stores personal information that specifies an individual and the reference image in association with each other, the subject of the face image as a person having the personal information associated with the reference image of the same person as the subject.

(Supplementary Note 28)

The computer-readable recording medium that records the biometric authentication program according to supplementary note 27, wherein the biometric authentication is any of checking a use qualification of a person having the personal information and checking a coincidence between the personal information about a person to be authenticated and the personal information about the subject.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-016046, filed on Feb. 1, 2018, the disclosure of which is incorporated herein in its entirety by reference.

REFERENCE SIGNS LIST 10, 20, 30 Biometric authentication device
11 Display information output unit
13 Face image acquisition unit
14 Line-of-sight detection unit
15 Biometric determination unit
16 Authentication unit
17 Authentication result output unit
28 Reference image storage unit
32 Touch position reception unit
40 Image capturing device
50 Display device
90 Information processing device
91 Communication interface
92 Input/output interface
93 Arithmetic device
94 Storage device
95 Non-volatile storage device
96 Drive device
97 Recording medium

What is claimed is:

1. A biometric authentication device comprising one or more memories storing instructions and one or more processors configured to execute the instructions to:

output, to a display device, display information about a symbol to be moved and displayed on the display device;

receive, from the display device, touch position information indicating a touch position of a touch input on the display device when the touch input is performed on the display device;

acquire a face image of a subject, the face image captured by an image capturing device at an image capturing timing while the display device displays the symbol and when the touch position information is received;

detect, from the face image, a line-of-sight position that is a position on the display device ahead of a line of sight of the subject;

determine that the subject of the face image is a living body when one or more predetermined conditions, including that the line-of-sight position coincides with a display position of the symbol at the image capturing timing and including that the touch position indicated by the touch position information coincides with the display position, are all satisfied;

perform biometric authentication based on the face image; and output an authentication result as indicating an authentication success in response to determining that the subject is the living body and that the biometric authentication is successful, and output the authentication result as indicating an authentication failure in response to determining that the subject is not the living body or that the biometric authentication has failed.

2. The biometric authentication device according to claim 1, wherein the symbol moves on the display device in a random direction.

3. The biometric authentication device according to claim 1, wherein the symbol moves continuously on the display device.

4. The biometric authentication device according to claim 1, wherein the one or more processors are configured to execute the instructions to cause the image capturing device to capture the face image when the touch position information is received.

5. The biometric authentication device according to claim 1, wherein the one or more processors are configured to execute the instructions to cause the image capturing device to continuously capture a plurality of images of the subject starting before the touch input is performed, and acquire, as the face image, the image captured a predetermined time before the touch position information is received, from the captured images.

6. The biometric authentication device according to claim 1, wherein the one or more processors are configured to execute the instructions to cause the image capturing device to continuously capture a plurality of images of the subject;

receive touch time information indicating a time at which the touch input is performed; and acquire, as the face image, the image captured at a touch time indicated by the touch time information, from the captured images.

7. The biometric authentication device according to claim 1, wherein the one or more processors are configured to execute the instructions to regard, when a reference image of a same person as the subject of the face image is stored in an association with personal information specifying an individual, the subject of the face image as that of a person having the personal information associated with the reference image of the same person as the subject.

8. The biometric authentication device according to claim 7, wherein the biometric authentication is any of checking a use qualification of the person having the personal information and checking whether personal information of a target person to be authenticated and the personal information specifying the individual are identical.

9. A biometric authentication method comprising:
outputting, to a display device, display information about a symbol which is to be moved and displayed on the display device;
receiving, from the display device, touch position information indicating a touch position of a touch input on the display device when the touch input is performed on the display device;
acquiring a face image of a subject, the face image captured by an image capturing device at an image capturing timing while the display device displays the symbol and when the touch position information is received;
detecting, from the face image, a line-of-sight position that is a position on the display device ahead of a line of sight of the subject;
determining that the subject of the face image is a living body when one or more predetermined conditions, including that the line-of-sight position coincides with a display position of the symbol at the image capturing timing and including that the touch position indicated by the touch position information coincides with the display position, are all satisfied;
performing biometric authentication based on the face image; and
outputting an authentication result as indicating an authentication success in response to determining that the subject is the living body and that the biometric authentication is successful, and output the authentication result as indicating an authentication failure in response to determining that the subject is not the living body or that the biometric authentication has failed.

10. The biometric authentication method according to claim 9, wherein the symbol moves on the display device in a random direction.

11. The biometric authentication method according to claim 9, wherein the symbol moves continuously on the display device.

12. The biometric authentication method according to claim 11, further comprising:
causing the image capturing device to capture the face image when receiving the touch position information.

13. The biometric authentication method according to claim 11, further comprising:
causing the image capturing device to continuously capture a plurality of images of the subject starting before the touch input is performed, and acquiring, as the face image, the image captured a predetermined time before the touch position information is received, from the captured images.

14. The biometric authentication method according to claim 11, further comprising:
causing the image capturing device to continuously capture a plurality of images of the subject;
receiving touch time information indicating a time at which the touch input is performed; and
acquire, as the face image, the image captured at a touch time indicated by the touch time information, from the captured images.

15. The biometric authentication method according to claim 9, further comprising:
regarding, when a reference image of a same person as the subject of the face image is stored in an association with personal information specifying an individual, the subject of the face image as that of a person having the personal information associated with the reference image of the same person as the subject.

16. The biometric authentication method according to claim 15, wherein wherein the biometric authentication is any of checking a use qualification of the person having the personal information and checking whether personal information of a target person to be authenticated and the personal information specifying the individual are identical.

17. A non-transitory computer-readable recording medium that records a biometric authentication program causing a computer to perform:
outputting, to a display device, display information about a symbol which is to be moved and displayed on the display device;
receiving, from the display device, touch position information indicating a touch position of a touch input on the display device when the touch input is performed on the display device;
acquiring a face image of a subject, the face image captured by an image capturing device at an image capturing timing while the display device displays the symbol and when the touch position information is received;
detecting, from the face image, a line-of-sight position that is a position on the display device ahead of a line of sight of the subject;
determining that the subject of the face image is a living body when one or more predetermined conditions, including that the line-of-sight position coincides with a display position of the symbol at the image capturing timing and including that the touch position indicated by the touch position information coincides with the display position, are all satisfied;
performing biometric authentication based on the face image; and
an authentication result as indicating an authentication success in response to determining that the subject is the living body and that the biometric authentication is successful, and output the authentication result as indicating an authentication failure in response to determining that the subject is not the living body or that the biometric authentication has failed.

18. The non-transitory computer-readable recording medium according to claim 17, wherein the symbol moves on the display device in a random direction.

* * * * *